United States Patent [19]

Fujioka

[11] Patent Number: 5,607,501

[45] Date of Patent: Mar. 4, 1997

[54] HOT MELT INK UTILIZABLE FOR INK JET PRINTER

[75] Inventor: Masaya Fujioka, Nagoya, Japan

[73] Assignee: Brother Kogyo Kabushiki Kaisha, Nagoya, Japan

[21] Appl. No.: 507,009

[22] Filed: Jul. 25, 1995

[30] Foreign Application Priority Data

Jul. 26, 1994 [JP] Japan .................... 6-174333

[51] Int. Cl.⁶ ................................. C09D 11/12
[52] U.S. Cl. .............. 106/22 A; 106/22 H; 106/31 R
[58] Field of Search ................ 106/22 A, 22 H, 106/31 R

[56]     References Cited

U.S. PATENT DOCUMENTS

| 4,390,369 | 6/1983 | Merritt, et al. | 106/31 R |
| 4,659,383 | 4/1987 | Lin et al. | 106/27 R |
| 4,758,276 | 7/1988 | Lin et al. | 106/27 R |
| 4,820,346 | 4/1989 | Nowak | 106/22 A |
| 4,822,418 | 4/1989 | Lin et al. | 106/27 R |
| 4,889,560 | 12/1989 | Jaeger et al. | 106/27 R |
| 5,230,731 | 7/1993 | Kanbayashi et al. | 106/22 A |
| 5,270,730 | 12/1993 | Yaegashi et al. | 106/22 A |
| 5,286,288 | 2/1994 | Tobias et al. | 106/22 A |
| 5,298,062 | 3/1994 | Davies et al. | 106/22 A |

FOREIGN PATENT DOCUMENTS

| 58-108271 | 6/1983 | Japan . |
| 59-22973 | 2/1984 | Japan . |
| 61-83268 | 4/1986 | Japan . |
| 218710 | 4/1990 | Japan . |
| 2167373 | 6/1990 | Japan . |
| 2206661 | 8/1990 | Japan . |
| 5125316 | 5/1993 | Japan . |
| 5194899 | 8/1993 | Japan . |

OTHER PUBLICATIONS

Computer printout of Common Names of Ultranox 626, Irganox 1010 and Naugard 76 from Chem Abstracts File Registry, 8 pages.

*Primary Examiner*—Helene Klemanski
*Attorney, Agent, or Firm*—Kane, Dalsimer, Sullivan, Kurucz, Levy, Eisele and Richard, LLP

[57]     ABSTRACT

Disclosed is a hot melt ink utilizable for an ink jet printer, the hot melt ink being prepared by mixing distearyl ketone (91 parts by weight), α-olefin maleic anhydride copolymer (6 parts by weight) and 1,1,3-tris(3-tert-butyl-4-hydroxy-6-methyl) butane (1 part by weight), thereafter by adding C.I. SOLVENT RED 49 (2 parts by weight) to the obtained mixture, and by sufficiently stirring and dissolving C.I. SOLVENT RED 49 in the ink.

18 Claims, 2 Drawing Sheets

HOT MELT INK UTILIZABLE FOR INK JET PRINTER

BACKGROUND OF THE INVENTION

1. Field of the Invention

The present invention relates to a hot melt ink utilizable for an ink jet printer, in particular to a hot melt ink which exists in a solid state at a room temperature (ordinary temperature) and is used in an ink jet printer after being thermally melted over the room temperature when printing is conducted by the ink jet printer.

2. Description of Related Art

In general, an ink jet printer has various advantages in printing because of being noiseless, high speed printing, high quality printing and ability of color printing. On the other hand, since the ink jet printer conducts printing by directly adhering onto a print sheet ink droplets jetted from nozzles, printing quality or drying time of the ink droplets is influenced by quality of the print sheet, as a result, there is a problem that printing quality of the ink jet printer remarkably goes down when printing is conducted onto a print sheet with low quality.

In order to dissolve the above problem, it has been conventionally proposed an ink jet printer which can print images with ink dots having uniform diameters onto the print sheet in spite of quality of the print sheet, by using a hot melt type ink which has a melting point higher than the room temperature. As ink composition of the hot melt ink, it is known an ink including a natural wax disclosed in the specification of U.S. Pat. No. 4,390,369 (Japanese Patent Application Laid Open No. Sho 58-108,271), an ink including stearic acid disclosed in the specification of U.S. Pat. No. 4,758,276 (Japanese Patent Application Laid Open No. SHo 59-22,973), and an ink which includes acid or alcohol of carbon number 20–24 and acid or alcohol of carbon number 14–19 and includes ketone having a relatively high melting point and a dye as colorant, disclosed in the specification of U.S. Pat. No. 4,659,383 (Japanese Patent Application Laid Open No. Sho 61-83,268). Further, it is disclosed in U.S. Pat. No. 4,659,383 and Japanese Patent Application after substantive examination, Laid Open No. Hei 2-18,710, a hot melt ink in which a solid pigment is dispersed in wax having a melting point higher than 65° C., or fatty acid or alcohol of carbon number 18–24.

In Japanese Patent Application Laid Open No. Hei 5-125,316, it is disclosed a hot melt ink composition which includes a natural wax having penetration grade less than 2, the penetration grade being measured by a penetration testing apparatus and appreciated based on a depth that a needle penetrates under a predetermined condition according to Japanese Industrial Standard (JIS) K2207, K2220, K2235, a dye dissolving agent with a melting point higher than 80° C. and a dye. By utilizing such hot melt ink, it can prevent inferiority of printing quality occurring due to blurring generated when the ink is re-melted during ink fixation by heat or pressure, or due to offset generated when the ink is adhered to a pressure roller.

Further, it is disclosed in Japanese Laid Open Nos. Hei 2-167,373, Hei 2-206,661 and Hei 5-194,899, a hot melt ink in which an antioxidant is added thereto.

However, in the hot melt ink using a pigment as a colorant among the conventional hot melt inks mentioned above, the pigment itself has a heat resistant stability, but does not have a sufficient dispersing stability. Accordingly, it is apt to occur blinding of orifices in an ink jet head installed in the ink jet printer or deviation of flying curves of ink droplets ejected from the orifices. Further, such hot melt ink including pigment cannot realize color clearness obtained by the hot melt ink including a dye as a colorant.

On the contrary, in case of the hot melt ink using a dye as a colorant, there scarcely occurs blinding of orifices or deviation of flying curves of ink droplets since the dye itself sufficiently dissolves in the ink. Thus, clear printing can be conducted by combining the dye and a suitable dye dissolving agent (color coupler). However, while conserving the hot melt ink in a melted state by heating for a long time, the dye itself or the dye dissolving color coupler is thermally deteriorated. As a result, there will occur a problem that discoloration and deposition of the dye are generated.

In particular, in case that a xanthene dye is used as the dye in the hot melt ink, coloring thereof is obstructed due to thermal deterioration of the dye dissolving color coupler, thereby there is a heavy problem that impermissible discoloration occurs. However, it is a fact that the xanthene dye as a colorant can realize an excellent clearness of magenta color, which can never be obtained by the other dye, among three primary colors in printing such as cyan color, magenta color and yellow color, by combining a suitable dye dissolving color coupler.

As mentioned above, the xanthene dye has different two aspects: the first aspect is that the xanthene dye is very useful for a colorant in the hot melt ink; the second aspect is that the xanthene dye is apt to be discolored by heating.

Under the above situation, in the hot melt ink disclosed in Japanese Laid Open Nos. Hei 2-167,373, Hei 2-206,661 and Hei 5-194,899 (previously raised), the ink is improved by using the antioxidant therein so that viscosity of the ink is not increased when heated and the ink concludes to have light resistance. However, it is not considered a problem of heat discoloration which occurs in case that the xanthene dye is used as a colorant in the hot melt ink.

SUMMARY OF THE INVENTION

Accordingly, it is an object of the present invention to overcome the above mentioned problems and to provide a hot melt ink utilizable for an ink jet printer, in which heat discoloration does not occur even if the xanthene dye is used as a colorant.

To accomplish the object, the present invention comprises a hot melt ink utilizable for an ink-jet printer, the hot melt ink existing a solid state at a room temperature and being used in a liquid state after melted, the hot melt ink comprising:

a xanthene dye;

a dye dissolving color coupler in molecules of which carboxylic group or amide group is included; and an antioxidant.

In the hot melt ink of the present invention, the xanthene dye acts as a colorant and is colored in clear magenta color by combining the suitable dye dissolving color coupler. The dye dissolving color coupler has a function not only to sufficiently dissolve the xanthene dye in a composition of the ink but also to color the xanthene dye in clear magenta color. The antioxidant has a function to prevent the xanthene dye, the dye dissolving color coupler and the other components of the ink from being oxidized and deteriorated under a heated condition. In particular, the antioxidant has an excellent effect against heat deterioration of the dye dissolving color coupler.

Therefore, according to the hot melt ink for an ink jet printer of the present invention, since the ink includes the xanthene dye and the dye dissolving color coupler in molecules of which carboxylic group or amide group is included, the hot melt ink can be used as a magenta ink for an ink jet printer and images with high quality and clearness of magenta color can be printed by an ink jet printer. Further, since the ink includes the anitioxidant, it can provide the hot melt ink having a good conservational ability under a heated condition without deteriorating coloring ability of the xanthene dye even if the ink is conserved for a long time under a heated condition.

The above and further objects and novel features of the invention will more fully appear from the following detailed description when the same is read in connection with the accompanying drawings. It is to be expressly understood, however, that the drawings are for purpose of illustration only and not intended as a definition of the limits of the invention.

BRIEF DESCRIPTION OF THE DRAWINGS

The invention will be described with reference to the following drawings, wherein.

DETAILED DESCRIPTION OF THE PREFERRED EMBODIMENTS

A detailed description of the preferred embodiments will now be given referring to the accompanying drawings. The hot melt ink according to the embodiments includes a xanthene dye, a dye dissolving color coupler having carboxylic group or amide group in molecules thereof and an antioxidant.

(EXAMPLE 1)

The hot melt ink according to EXAMPLE 1 includes: COLOR INDEX SOLVENT RED 49 (C.I. SOLVENT RED 49) as the xanthene dye; α-olefin maleic anhydride copolymer as the dye dissolving color coupler; and 1,1,3-tris(3-tert-butyl-4-hydroxy-6-methylphenyl)butane, which is a phenolic antioxidant, as the antioxidant.

Here, in fact, NEPTUNE RED BASE 543 manufactured by BASF CO. LTD. is used as C.I. SOLVENT RED 49; POWAX H-10 manufactured by NIPPON PETROLEUM CO. LTD. is used as the α-olefin maleic anhydride copolymer; ADECASTAB A0-30 manufactured by ASAHI DENKA CO. LTD. is used as the 1,1,3-tris(3-tert-butyl-4-hydroxy-6-methylphenyl)butane. Further, the hot melt ink of the EXAMPLE 1 includes distearyl ketone (KAO WAX T-1 manufactured by KAO CORPORATION), as a main component which is melted by heating.

The ink composition of EXAMPLE 1 has the following formulation.

| | |
|---|---|
| KAO WAX T-1 (distearyl ketone) | 90 weight % |
| POWAX H-10 (α-olefin maleic anhydride copolymer) | 6 weight % |
| ADECASTAB A0-30 (1,1,3-tris(3-tert-butyl-4-hydroxy-6-methylphenyl)butane) | 1 weight % |
| NEPTUNE RED BASE 543 (C.I. SOLVENT RED 49) | 2 weight % |

Figure 1:
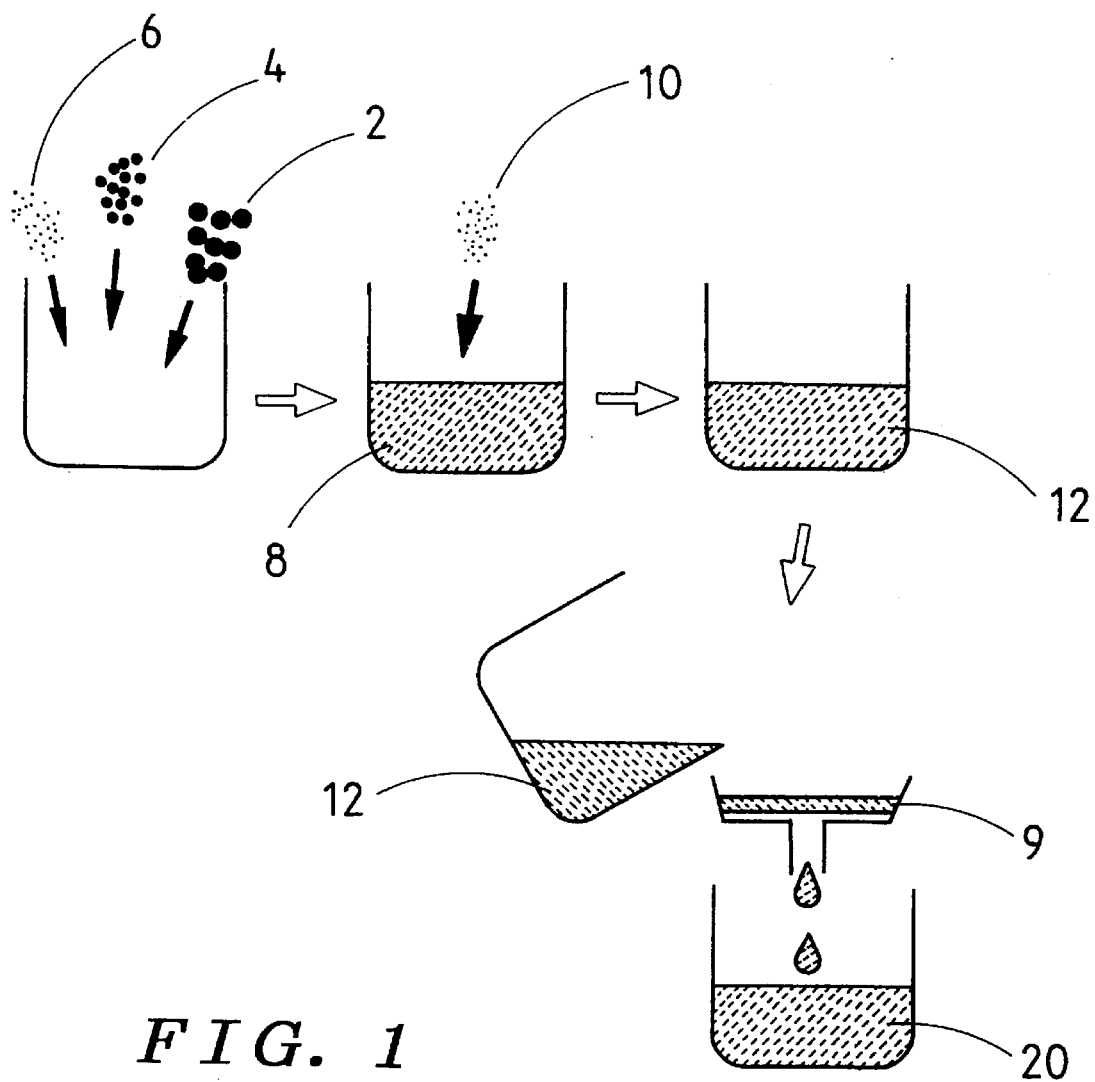
FIG. 1 is a schematic illustration for explaining a process for producing the hot melt ink according to the first embodiment.

The hot melt ink of EXAMPLE 1 can be prepared in the following procedure shown in FIG. 1. In FIG. 1, at first, stearyl ketone 2 (91 parts by weight), α-olefin maleic anhydride copolymer 4 (6 parts by weight) and 1,1,3-tris(3-tert-butyl-4-hydroxy-6-methylphenyl)butane 6 (1 part by weight) are mixed together under heating condition of 130° C., thereby mixture 8 is obtained. Further, C.I. SOLVENT RED 49 10 (2 parts by weight) is added to the mixture 8, and is sufficiently stirred by using a stirrer (not shown), thereby C.I. SOLVENT RED 49 10 is dissolved therein. As a result, colored mixture 12 is obtained.

Two or three drops of the colored mixture 12 prepared according to the above are melted on a glass slide heated to 120° C., on which a glass cover plate is placed and pressed slightly, followed by observation through a microscope (XF-UNR manufactured by NIKON CORPORATION) using transmitted light. As a result, few particles are found in the melted state. This reveals that substantially all of the dye, i.e., C.I. SOLVENT RED 49 10 is sufficiently dissolved in the melted state.

The colored mixture 12 is filtered through a 2 μm mesh filter 9 of a heating filtration device manufactured by TOYO ROSHI KAISHA LTD., to obtain a final hot melt ink 20.

The hot melt ink 20 may be suitably used as a hot melt ink for an ink jet printer. For instance, the hot melt ink 20 is ejected from an ink jet head under a heated condition of 100° C.–140° C., in which the hot melt ink 20 is melted. As a result, printing could be conducted without occurring blinding of the orifices of the ink jet head and deviation of flying curves of ink droplets. Further, it was found that the printed images such as characters were colored in magenta with very excellent clearness. The hot melt ink 20 could reproduce cyan color and yellow color with very excellent clearness based on clear magenta color thereof, by printing cyan ink and yellow ink, both being independently prepared, in superposition to the images printed though the hot melt ink 20.

Next, life (conservation) test of the hot melt ink 20 was conducted. In the life test, the hot melt ink 20 was conserved for 15 days under a heated condition of 120° C., thereafter printing was done by using the conserved ink through an ink jet printer. As a result, it was found that the printed images were colored in magenta color with clearness which was as same as that of the ink not being conserved. Therefore, as understandable form the above, the hot melt ink 20 was not discolored even if conserved for a long time under a heated condition, thus it was confirmed that the images could be printed with good clearness of magenta color by the hot melt ink.

Here, in the hot melt ink 20 of EXAMPLE 1, coloring of clear magenta color was produced by combining C.I. SOLVENT RED 49 as the dye and α-olefin maleic anhydride copolymer as the dye dissolving color coupler, and it was prevented heat deterioration of α-olefin maleic anhydride copolymer by 1,1,3-tris(3-tert-butyl-4-hydroxy-6-methylphenyl)butane as the antioxidant. Thereby, the hot melt ink 20 concluded to have excellent heat resistance without discoloring even if it was conserved for a long time under a heated condition.

From the above, according to EXAMPLE 1, it would be the best combination in which C.I. SOLVENT RED 49 as the xanthene dye, α-olefin maleic anhydride copolymer as the dye dissolving color coupler and 1,1,3-tris(3-tert-butyl-4-hydroxy-6-methylphenyl)butane (phenol antioxidant) as the oxidant, are used.

(EXAMPLE 2)

In EXAMPLE 2, the hot melt ink was prepared according to the same procedure as in EXAMPLE 1. The hot melt ink in accordance with EXAMPLE 2 includes: C.I. SOLVENT RED 49 (Oil Pink 330 manufactured by CHUO GOSEI KAGAKU CO. LTD.) as the xanthene dye; stearic acid amide (FATTY ACID AMIDES manufactured by KAO CORPORATION) as the dye dissolving color coupler; and 4,4'-butylidenebis(3-methyl-6-tert-butylphenol) (Sumilizer B BM-S manufactured by SUMITOMO KAGAKU CO. LTD.) classified in phenolic antioxidant as the antioxidant. Further, the hot melt ink of EXAMPLE 2 includes a paraffin wax (HNP-10 manufactured by NIPPON SEIRO CO. LTD.) as a main component which is melted by heating.

The ink composition of EXAMPLE 2 has the following formulation.

| HNP-10 | 78.5 weight % |
|---|---|
| FATTY ACID AMIDE S | 20 weight % |
| Sumilizer BBM-S | 0.5 weight % |
| Oil Pink 330 | 1 weight % |

(EXAMPLE 3)

In EXAMPLE 3, the hot melt ink was prepared according to the same procedure as in EXAMPLE 1. The hot melt ink in accordance with EXAMPLE 3 includes: C.I. SOLVENT RED 49 (NEPTUNE RED BASE 543 manufactured by BASF CO. LTD.) as the xanthene dye; behenic acid (reagent manufactured by KANTO KAGAKU CO. LTD.) as the dye dissolving color coupler; and 1,1'-bis(4-hydroxyphenyl)cyclohaxane (Antigene W manufactured by SUMITOMO KAGAKU CO. LTD.) classified in phenolic antioxidant as the anitioxidant. Further, the hot melt ink of EXAMPLE 3 includes a polyethylene wax (POLYWAX 500 manufactured by TOYO PETROLITE CO. LTD.) as a main component which is melted by heating.

The ink composition of EXAMPLE 3 has the following formulation.

| POLYWAX 500 | 68.9 weight % |
|---|---|
| behenic acid (reagent) | 30 weight % |
| Antigene W | 0.1 weight % |
| NEPTUNE RED BASE 543 | 1 weight % |

It was found that both the inks of EXAMPLE 2 and EXAMPLE 3 could be suitably used as the hot melt ink for an ink jet printer. That is, for instance, each of the hot melt inks of EXAMPLE 2 and EXAMPLE 3 is ejected from an ink jet head under a heated condition of 100° C.–140 ° C., in which the hot melt ink is melted. As a result, printing could be conducted without occurring blinding of the orifices of the ink jet head and deviation of flying curves of ink droplets. Further, it was found that the printed images such as characters were colored in magenta color with very excellent clearness. The hot melt ink could reproduce cyan color and yellow color with very excellent clearness based on clear magenta color thereof, by printing cyan ink and yellow ink, both being independently prepared, in superposition to the images printed though the hot melt ink.

Next, life (conservation) test of each of the hot melt inks was conducted. In the life test, each hot melt ink was conserved for 15 days under a heated condition of 120° C., thereafter printing was done by using the conserved ink through an ink jet printer. As a result, it was found that the printed images were colored in magenta color with clearness which was as same as that of the ink not being conserved. Therefore, as understandable form the above, the hot melt ink was not discolored even if conserved for a long time under a heated condition, thus it was confirmed that the images could be printed with good clearness of magenta color by the hot melt ink.

Here, in the hot melt inks of EXAMPLE 2 and EXAMPLE 3, coloring of clear magenta color was produced by combining C.I. SOLVENT RED 49 as the dye and stearic acid amide or behenic acid as the dye dissolving color coupler, and it was prevented heat deterioration of stearic acid amide or behenic acid by 4,4'-butylidenebis(3-methyl-6-tert-butylphenol) or 1,1'-bis(4-hydroxyphenyl)cyclohaxane as the antioxidant. Thereby, each hot melt ink concluded to have excellent heat resistance without discoloring event if it was conserved for a long time under a heated condition.

In order to confirm effects of the dye dissolving color coupler and the antioxidant in the hot melt ink, hot melt inks of COMPARATIVE EXAMPLES 1 and 2 were prepared according to the same procedure as in EXAMPLE 1.

(COMPARATIVE EXAMPLE 1)

The ink composition of COMPARATIVE EXAMPLE 1 has the following formulation.

| KAO WAX T-1 (distearyl ketone) | 97 weight % |
|---|---|
| ADECASTAB AO-37 (1,1,3'-tris(3-tert-butyl-4-hydroxy-6-methylphenyl)butane) | 1 weight % |
| NEPTUNE RED BASE 543 (C.I. SOLVENT RED 49) | 2 weight % |

(COMPARATIVE EXAMPLE 2)

The ink composition of COMPARATIVE EXAMPLE 2 has the following formulation.

| KAO WAX T-1 (distearyl ketone) | 92 weight % |
|---|---|
| POWAX H-10 (α-olefin maleic anhydride copolymer) | 6 weight % |
| NEPTUNE RED BASE 543 (C.I. SOLVENT RED 49) | 2 weight % |

The hot melt ink of COMPARATIVE EXAMPLE 1 does not include the dye dissolving color coupler. Based on that, C.I. SOLVENT RED 49 as the xanthene dye could not be sufficiently dissolved in the ink and colored in magenta color. Further, it was found that many solid particles of the dye being not dissolved existed in the ink. Therefore, when the hot melt ink was filtered through a 2 μm mesh filter of the heating filtration device manufactured by TOYO ROSHI KAISHA LTD., the mesh filter was often blinded while filtration. The final hot melt ink was colored in thin pink color, thus such hot melt ink could not be used as magenta dye.

By the hot melt ink of COMPARATIVE EXAMPLE 2 prepared according to the above, the images with clear magenta color could be satisfactorily printed by using an ink jet printer, as in EXAMPLE 1. However, the hot melt ink of COMPARATIVE EXAMPLE 2 does not include the antioxidant. As a result of life test in which the ink was conserved for 15 days under a heated condition of 120° C., it was confirmed that the images printed through the conserved ink was clearly discolored in comparison with the images printed through the fresh ink which was not conserved, and the former images was colored in thin pink color.

Here, in each hot melt ink of EXAMPLES 1 and 2 mentioned above, the xanthene dye acts as a colorant, and can be used as magenta dye by which the images with clear magenta color can be printed through an ink jet printer by combining a suitable dye dissolving color coupler therewith. Quantity of the xanthene dye against to the whole ink can be freely selected irrelevant to EXAMPLES 1 and 2. At that time, it is desirable that 0.1–5 weight % of the xanthene dye is added in the composition of the ink. If quantity of the xanthene dye is less than 0.1 weight %, magenta color cannot be sufficiently realized. On the other hand, if quantity of the xanthene dye is more than 5 weight %, the dye is possible to be deposited in the ink. Here, taking into consideration heat characteristic demanded for the hot melt ink used under a condition in which the normal ink jet printer operates, and so as not to derive various problems such as increase of melting point of the ink, deposition of the dye, it is more preferable that quantity of the xanthene dye lies in a range of 0.2–3.5 weight %.

The dye dissolving color coupler acts for dissolving the xanthene dye into the composition of the hot melt ink and for coloring the xanthene dye in clear magenta color. Quantity of the dye dissolving color coupler against to the whole ink can be freely selected irrelevant to EXAMPLES 1 and 2. At that time, if coloring ability of the ink is considered to be important, it is preferable that quantity of the dye dissolving color coupler lies in a range of 0.5–50 weight %. Further, it is preferable that quantity of the dye dissolving color coupler is added more than quantity of the xanthene dye by weight ratio, and more preferably, quantity of the dye dissolving color coupler is more than twice of quantity of the xanthene dye. In case that quantity of the dye dissolving color coupler is less than quantity of the xanthene dye, there will occur a problem that the dye is not sufficiently dissolved in the ink composition or the dye is not sufficiently colored.

Further, irrelevant to EXAMPLES 1 and 2, as the dye dissolving color coupler included in the ink, it can be used organic compound in moleculars of which carboxylic group or amide group exists. Concretely, the following organic compounds are preferably used as the dye dissolving color coupler.

As the compound having carboxylic group in molecules thereof, it can raise; fatty acid (preferably, lauric acid, myristic acid, palmitic acid, stearic acid, iso-stearic acid, 1,2-hydroxy stearic acid) ; and maleic acid copolymer (preferably, α-olefin maleic anhydride copolymer).

Figure 2:
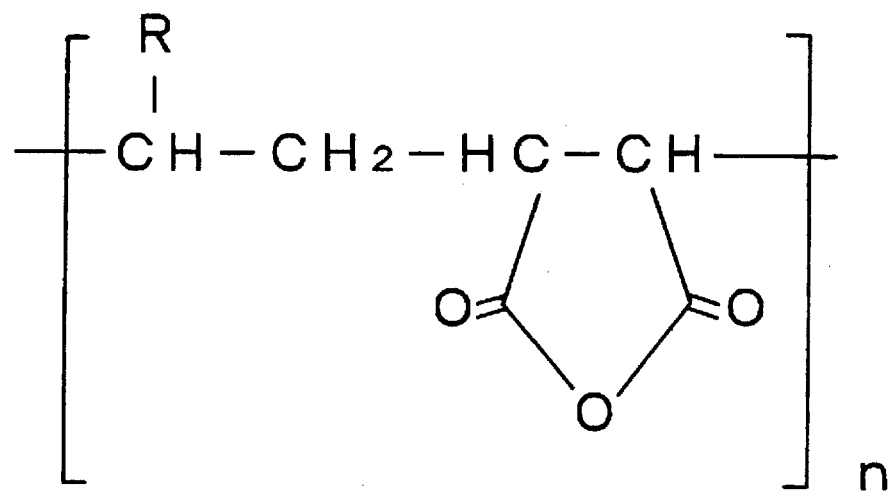
FIGS. 2(A) and 2(B) are structural illustrations for explaining chemical formulas of α-olefin maleic anhydride copolymer.
Figure 2:
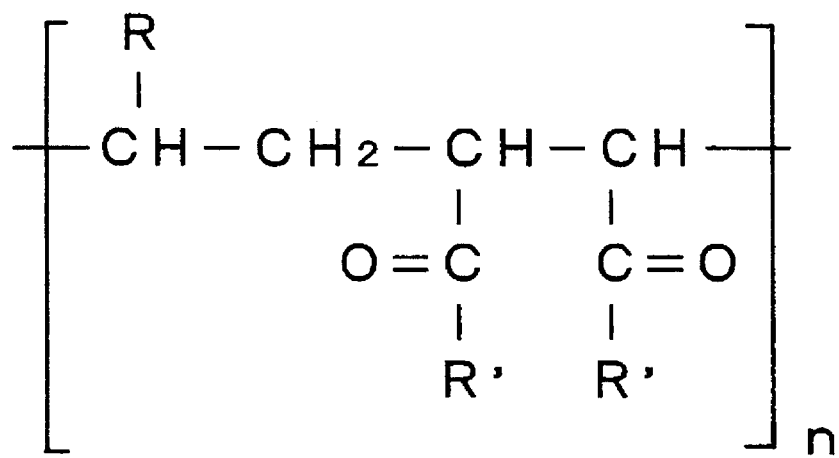

Here, in α-olefin maleic anhydride copolymer, maleic acid structure therein may exist in a closed ring structure or an open ring structure, as shown in FIGS. 2A and 2B. Further, the closed ring structure and the open ring structure in maleic acid structure may exist at voluntary ratio in α-olefin maleic anhydride copolymer. In chemical formulas of FIG. 2, R and R' represent alkyl group. Further, byproduct such as alkenyl succinic anhydride or 1-alkene, which is produced during polymerization process, may be included in α-olefin maleic anhydride copolymer.

As the compound having amide group in molecules thereof, it can raise ; saturated fatty acid monoamide (preferably, lauramide, palmitamide, behenamide, 1,2-hydroxy stearamide); unsaturated fatty acid monoamide (preferably, oleamide, erucamide, recinoleamide); N-substituted fatty acid amide (more preferably, N-stearyl stearamide, N-behenyl behenamide, N-stearyl behenamide, N-behenyl stearamide, N-oleyl oleamide, N-oleyl stearamide, N-stearyl oleamide, N-stearyl erucamide, N-oleyl palmitamide; methylol amide (more preferably, methylol stearamide, methylol behenamide); saturated fatty acid bis-amide (more preferably, methylene bis-stearamide, ethylene bis-stearamide, ethylene bis-isostearamide, ethylene bis-hydroxystearamide, ethylene bis-behenamide, hexamethylene bis-stearamide, hexamethylene bis-behenamide, hexamethylene bis-hydroxystearamide, N,N'-distearyl adipamide, N,N'-distearyl sebacamide); unsaturated fatty acid bis-amide (more preferably, ethylene bis-oleamide, hexamethylene bis-oleamide, N,N'-dioleyl adipamide, N,N'-dioleyl sebacamide; saturated or unsaturated fatty acid tetra amide.

Among the dye dissolving color couplers raised above, the best dye dissolving color coupler is α-olefin maleic anhydride copolymer.

The dye dissolving color couplers mentioned above may be used singly or in combinations of two or more. Further, in case that the dye dissolving color coupler itself has the melting point higher than the ordinary (room) temperature and is melted and liquefied at a temperature higher than the melting point, the dye dissolving color coupler may conclude to have the characteristic as the main component which is melted by heating. That is, in this case, it is not necessary to independently add the main component, which is melted by heating, to the ink if the dye dissolving color coupler may act as such main component.

The antioxidant included in the hot melt ink of each of EXAMPLES 1 and 2 acts so that the xanthene dye, the dye dissolving color coupler and the other components of the ink are not oxidized and deteriorated by heating. In particular, the anitioxidant has a excellent effect against heat deterioration of the dye dissolving color coupler.

Quantity of the antioxidant against to the whole ink can be freely selected irrelevant to EXAMPLES 1 and 2. At that time, it is preferable that quantity of the antioxidant lies in a range of 0.01–10 weight % in the composition of the ink. In case that quantity of the antioxidant is less than 0.01 weight %, the antioxidant cannot efficiently prevent oxidization of the xanthene dye and the dye dissolving color coupler. On the contrary, if quantity of the anitioxidant is more than 10 weight % it may occur that the anitioxidant is deposited due to slight heat change of the ink.

Here, taking into consideration heat characteristic demanded for the hot melt ink used under a condition in which the normal ink jet printer operates, and so as not to derive various problems such as increase of melting point of the ink, deposition of the dye, it is more preferable that quantity of the anitioxidant lies in a range of 0.05–5 weight %.

Further, irrelevant to EXAMPLES 1 and 2, as the anitioxidant in the ink, it can be used various compounds. Concretely, the following phenolic antioxidants are preferably used as the antioxidant of the ink, since phenolic antioxidant has an excellent effect for preventing oxidization of the xanthene dye and the dye dissolving color coupler. As phenolic antioxidant, it may be used; 2,6-di-tert-butyl-4-methylphenol, styrenated phenol, n-octadecyl-3-(3,5-di-tert-butyl-4-hydroxyphenyl) propionate, 2,2'-methylenebis(4-methyl-6-tert-butyl phenol), 2-tert-butyl-6-(3-tert-butyl-2-hydroxy-5-methylbenzyl)-4-methylphenyl acrylate, 4,4'-thiobis(3-methyl-6-tert-butylphenol), tetrakis[methylene3-(3,5-di-tert-butyl-4-hydroxyphenyl)propionate]methane, 3,9-bis{2-[3-(3-tert-butyl-4-hydroxy-5-methylphenyl)-propionyloxy]-1,1-dimethyethyl}-2,4,8,1-O-tetraoxaspiro[5,5] undecane, butyl hydroxy anisole, 2,6-di-tert-butyl-4-ethylphenol, 2,2'-methylenebis(4-ethyl-6-tert-butyl phenol), 1,3,5-trimethyl-2,4,6-tris(3,5-di-tert-butyl-4-hydroxybenzyl) benzene, bis-[3,3'-is-(4'-hydroxy-3'-tert-butyl-phenyl)-butyricacid]glycol ester, 1,3,5-tris(3,',5'-di-tert-butyl-4'0-hydroxybenzyl)-S-triazine-2,4,6-(1H,3H,5H)trione.

Phenolic antioxidants raised in the above may be used singly or in combinations of two or more.

Here, 1,1,3-tris(3-tert-butyl-4-hydroxy-6-methylphenyl) butane has a excellent effect for preventing discoloring of the ink during conservation under a heated condition, in comparison with the phenol antioxidants mentioned above. Therefore, 1,1,3-tris(3-tert-butyl-4-hydroxy-6-methylphenyl) butane is the most preferable antioxidant for the hot melt ink of the present invention.

Further, in EXAMPLES 1 and 2, the main component which is melted by heating may be added in the ink if necessary and resin may be added in the ink to give clearness or adhesive property to the ink. The main component is made of organic material having wax like property, the organic material having a melting point higher than 50° C. and lower than 150° C. Such organic material may be used as the main component if it is, at least under the melted state, compatible with the dye dissolving color coupler. As concerns the resin, the resin may be used if it is, under the melted state, compatible with the main component or the dye dissolving color coupler. Further, it may be added viscosity adjusting agent, ultra violet absorption agent, pliability giving agent, adhesion property giving agent, surface tension adjusting agent, melting point adjusting agent and the like. And it may add the dye or pigment other than the xanthene dye, as the color adjusting agent, if necessary.

While the invention has been particularly shown and described with reference to preferred embodiments thereof, it will be understood by those skilled in the art that the foregoing and other changes in form and details can be made therein without departing from the spirit and scope of the invention.

What is claimed is:

1. A hot melt ink utilizable for an ink jet printer, the hot melt ink existing in solid state at a room temperature and being used in liquid state after melted, the hot melt ink comprising:

a xanthene dye;

a dye dissolving color coupler in molecules of which carboxylic group or amide group is included; and an antioxidant;

wherein the antioxidant comprises phenolic antioxidant and the dye dissolving color coupler including carboxylic group comprises at least one of: fatty acid selected from the group consisting of behenic acid, lauric acid, myristic acid, palmitic acid, stearic acid, iso-stearic acid, 1,2-hydroxy stearic acid; and maleic acid copolymer selected from the group consisting of α-olefin maleic anhydride copolymer.

2. The hot melt ink according to claim 1, further comprising a supporting component for mainly supporting the ink, the supporting component being melted by heating and comprising material selected from the group consisting of distearyl ketone, paraffin wax and polyethylene wax.

3. The hot melt ink according to claim 1, wherein the xanthene dye is C.I. SOLVENT RED 49.

4. The hot melt ink according to claim 1, wherein the xanthene dye is present in an amount of from 0.1–5 weight %.

5. The hot melt ink according to claim 4, wherein the xanthene dye is present in an amount of from 0.2–3.5 weight %.

6. The hot melt ink according to claim 1, wherein the dye dissolving color coupler is present in an amount of from 0.5–50 weight %.

7. The hot melt ink according to claim 1, wherein the antioxidant is present in an amount of from 0.01–10 weight %.

8. The hot melt ink according to claim 7, wherein the antioxidant is present in an amount of from 0.05–5 weight %.

9. A hot melt ink utilizable for an ink jet printer, the hot melt ink existing a solid state at a room temperature and being used in a liquid state after melted, the hot melt ink comprising:

a xanthene dye ;

a dye dissolving color coupler in molecules of which carboxylic group or amide group is included; and an antioxidant;

wherein the xanthene dye is C.I. SOLVENT RED 49, the dye dissolving color coupler is α-olefin maleic anhydride copolymer, and the antioxidant is 1,1,3-tris-(3-tert-butyl-4-hydroxy-6-methylphenyl)butane.

10. A hot melt ink utilizable for an ink jet printer, the hot melt ink existing in solid state at a room temperature and being used in liquid state after melted, the hot melt ink comprising:

a xanthene dye;

a dye dissolving color coupler in molecules of which carboxylic group or amide group is included; and an antioxidant;

wherein the antioxidant comprises phenolic antioxidant and wherein the phenolic antioxidant comprises at least one of: 1,1,3-tris(3-tert-butyl-4-hydroxy-6-methylphenyl) butane, 4,4'-butylidenebis(3-methyl-6-tert-butylphenol), 1,1-bis(4-hydroxyphenyl)cyclohexane, 2,6-di-tert-butyl-4-methylphenol, styrenated phenol, n-octadecyl-3-(3,5-di-tert-butyl-4-hydroxyphenyl)propionate, 2,2'-methylenebis(4-methyl-6-tert-butyl phenol), 2-tert-butyl-6-(3-tert-butyl-2-hydroxy-5-methylbenzyl)-4-methylphenyl acrylate, 4,4'-thiobis(3-methyl-6-tert-butylphenol), tetrakis[methylene3-(3,5-di-tert-butyl-4-hydroxyphenyl)propionate]methane, 3,9-bis{2-[3-(3-tert-butyl-4-hydroxy-5-methylphenyl)-propionyloxy]-1,1-dimethyethyl}-2,4,8,1-O-tetraoxaspiro[5,5]undecane, butyl hydroxy anisole, 2,6-di-tert-butyl-4-ethylphenol, 2,2'-methylenebis(4-ethyl-6-tert-butyl phenol), 1,3,5-trimethyl-2,4,6-tris(3,5-di-tert-butyl-4-hydroxybenzyl)benzene, bis-[3,3'-is-(4'-hydroxy-3'-tert-butyl-phenyl)-butyricacid]glycol ester, 1,3,5-tris(3,',5'-di-tert-butyl-4'-hydroxybenzyl)-S-triazine-2,4,6-(1H,3H,5H)trione.

11. The hot melt ink according to claim 10, further comprising a supporting component for mainly supporting the ink, the supporting component being melted by heating and comprising material selected from the group consisting of distearyl ketone, paraffin wax and polyethylene wax.

12. The hot melt ink according to claim 10, wherein the xanthene dye is C.I. SOLVENT RED 49.

13. The hot melt ink according to claim 10, wherein the xanthene dye is present in an amount of from 0.1–5 weight %.

14. The hot melt ink according to claim 13, wherein the xanthene dye is present in an amount of from 0.2–3.5 weight %.

15. The hot melt ink according to claim 10, wherein the dye dissolving color coupler is present in an amount of from 0.5–50 weight %.

16. The hot melt ink according to claim 10, wherein the antioxidant is present in an amount of from 0.01–10 weight %.

17. The hot melt ink according to claim 16, wherein the antioxidant is present in an amount of from 0.05–5 weight %.

18. The hot melt ink according to claim 10, wherein the dye dissolving color coupler including amide group comprises at least one of: saturated fatty acid monoamide selected from the group consisting of lauramide, palmitamide, behenamide, 1,2-hydroxy stearamide; unsaturated fatty acid monoamide selected from the group consisting of stearamide, oleamide, erucamide, recinoleamide; N-substituted fatty acid amide selected from the group consisting of N-stearyl stearamide, N-behenyl behenamide, N-stearyl behenamide, N-behenyl stearamide, N-oleyl oleamide, N-oleyl stearamide, N-stearyl oleamide, N-stearyl erucamide, N-oleyl palmitamide; methylol amide selected from the group consisting of methylol stearamide, methylol behenamide; saturated fatty acid bis-amide selected from the group consisting of methylene bis-stearamide, ethylene bis-stearamide, ethylene bis-isostearamide, ethylene bis-hydroxystearamide, ethylene bis-behenamide, hexamethylene bis-stearamide, hexamethylene bis-behenamide, hexamethylene bis-hydroxystearamide, N,N'-distearyl adipamide, N,N'-distearyl sebacamide; unsaturated fatty acid bis-amide selected from the group consisting of ethylene bis-oleamide, hexamethylene bis-oleamide, N,N'-dioleyl adipamide, N,N'-dioleyl sebacamide; and saturated or unsaturated fatty acid tetra amide.

* * * * *